United States Patent
Ding et al.

(10) Patent No.: US 11,453,730 B2
(45) Date of Patent: Sep. 27, 2022

(54) PREPARATION METHOD OF CITRIC ACID MODIFIED STARCH WITH DIGESTION-RESISTANT PROPERTY

(71) Applicant: NANJING UNIVERSITY OF FINANCE AND ECONOMICS, Nanjing (CN)

(72) Inventors: Chao Ding, Nanjing (CN); Huajuan Zhang, Nanjing (CN); Tingting Tao, Nanjing (CN)

(73) Assignee: NANJING UNIVERSITY OF FINANCE AND ECONOMICS, Nanjing (CN)

( * ) Notice: Subject to any disclaimer, the term of this patent is extended or adjusted under 35 U.S.C. 154(b) by 0 days.

(21) Appl. No.: 17/429,637

(22) PCT Filed: Aug. 5, 2020

(86) PCT No.: PCT/CN2020/107135
§ 371 (c)(1),
(2) Date: Aug. 10, 2021

(87) PCT Pub. No.: WO2021/143108
PCT Pub. Date: Jul. 22, 2021

(65) Prior Publication Data
US 2022/0041761 A1    Feb. 10, 2022

(30) Foreign Application Priority Data
Jan. 17, 2020   (CN) .......................... 202010053002.2

(51) Int. Cl.
*C08B 31/04*   (2006.01)
*C08J 3/12*   (2006.01)

(52) U.S. Cl.
CPC ................. *C08B 31/04* (2013.01); *C08J 3/12* (2013.01); *C08J 2303/06* (2013.01)

(58) Field of Classification Search
CPC .......... C08B 31/04; C08J 3/12; C08J 2303/06
See application file for complete search history.

(56) References Cited

U.S. PATENT DOCUMENTS

2015/0342228 A1* 12/2015 Norris ................... A23L 29/212
426/244

FOREIGN PATENT DOCUMENTS

| CN | 101161684 A | 4/2008 |
| CN | 101475646 A | 7/2009 |
| CN | 101863994 A | 10/2010 |
| CN | 102161707 A | 8/2011 |
| CN | 102161708 A | 8/2011 |
| CN | 102993319 A | 3/2013 |
| CN | 103265641 A | 8/2013 |
| CN | 105348400 A | 2/2016 |
| CN | 109370474 A | 2/2019 |
| CN | 110372802 A | 10/2019 |
| CN | 111234042 A | 6/2020 |
| CN | 111423520 A | 7/2020 |
| KR | 101507563 B1 | 4/2015 |

OTHER PUBLICATIONS

Kai Wang, Study on the optimal preparation condition of citrate starc, Food & Machinery, 2011, pp. 140-159, vol. 27, No. 4.
Fen-Fen Li, Study on physicochemical characteristics of citrate sago starch, College of Yunyang Teachers, 2013, pp. 15-17.
Lu-Tian Feng, Studies on Corn Strach Modified by Citric Acid, Journal of Shenyang University of Chemical Technology, 2011, pp. 105-109, vol. 25 No. 02.
Mei Zhou, Optimized Production of the Highly Moisture—Absorbing Citrate Starch by the Utilization of Microwave-Ass, J. Food Science and Biotechnology, 2015, pp. 756-763, vol. 34 No. 7.
Jianxue Liu, Food Preservation, 2006, pp. 128-130, China Light Industry Press.
Kathiravan Krishnamurthy, et al., Infrared Heating in Food Processing:An Overview, Comprehensive Reviews in Food Science and Food Safety, 2008, pp. 2-13, vol. 7.
Navin K. Rastogi, Recent Trends and Developments in Infrared Heating in Food Processing, Critical Reviews in Food Science and Nutrition, 2012, pp. 737-760, vol. 52.

* cited by examiner

*Primary Examiner* — Eric Olson
*Assistant Examiner* — Everett White
(74) *Attorney, Agent, or Firm* — Bayramoglu Law Offices LLC

(57) ABSTRACT

The method employs citric acid as the modifier, combines the citric acid with starch, achieves the good modification effect of starch at high temperature, and improves the digestion-resistant property of starch. Citric acid itself is nontoxic, the process conditions are mild and the treatment methods are relatively safe, which shows very high practical values. In the method, starch and citric acid are cross-linked by using the infrared treatment technology, and the dry heating treatment is used to promote the modifier citric acid into starch, thereby achieving significant and stable modification effects, and high modification efficiency.

11 Claims, No Drawings

PREPARATION METHOD OF CITRIC ACID MODIFIED STARCH WITH DIGESTION-RESISTANT PROPERTY

CROSS REFERENCE TO THE RELATED APPLICATIONS

This application is the national phase entry of International Application No. PCT/CN2020/107135, filed on Aug. 5, 2020, which is based upon and claims priority to Chinese Patent Application No. 202010053002.2, filed on Jan. 17, 2020, the entire contents of which are incorporated herein by reference.

TECHNICAL FIELD

The present disclosure belongs to the field of food processing, in particular, relating to a preparation method of citric acid modified starch with a digestion-resistant property, and more particularly to a method of improving the digestion properties of natural starch by mixing cereal starch with a citric acid solution.

BACKGROUND

Starch, which belongs to a kind of renewable natural organic compound, is an important industrial raw material. However, due to poor stability, poor drug resistance, high gelatinization temperature, insolubility in cold water and other properties of native starch, the natural starch has great difficulty in the application process, and fails to meet the requirements of development and utilization of starch raw materials in industrial production. Therefore, on the basis of different physicochemical properties and structural differences of starch, natural starch is modified by using different treatment methods to change the structure of starch particles, thereby making it have the functional properties that native starch does not have. Modified starch may have some different properties that native starch cannot have, so it is used as an important raw material in industrial production, which has been widely applied in papermaking, food, medicine, textile, and other industries.

According to the statistics, the global annual output of modified starch at present is nearly 6 million tons, mainly from Europe, America and other developed countries. There are more than 300 manufacturers of modified starch in China, and the annual production capacity is 1.2 to 1.5 million tons. Modified starch has been developed rapidly and starts mass production in China, which has been widely used in industrial production and processing. Esterified starch is one of the modified starch, and it can reduce the gelatinization temperature of native starch and improve the retrogradation stability, thermal stability, freeze-thaw stability and other properties. Esterified starch can be divided into two classes including organic starch esters and inorganic starch esters and can be widely applied in the food and medicine industries.

Cereal is widely planted in China and has a high yield. Cereal contains a large amount of cereal starch, and the starch accounts for about 70% of the dry weight. In the present disclosure, natural cereal starch is used as the raw material to prepare citric acid modified starch with a digestion-resistant property, where the preparation efficiency is high, the raw material source is widespread, the process is simple and efficient, the digestion-resistant property is excellent, and the yield rate is high.

Starch citrate is an organic starch ester, that is, a starch derivative produced from the esterification reaction of the hydroxyl group of starch with an organic acid, and starch citrate has a digestion-resistant effect. Starch citrate keeps the original granular forms, and has good thermal stability because citric acid groups can prevent starch particles from expanding and gelatinizing to inhibit the enzymolysis. In this way, the content of resistant starch in the native starch may be increased to achieve a good digestion-resistant property. Therefore, starch citrate can be widely used in the fields of food and medicine as a functional food base material.

At present, the methods of synthesizing starch citrate mainly include a press-heating method and a dry-heating method. Most of the traditional preparation processes of starch citrate are based on the high-temperature drying method reported by Klaushofer et, al. For example, the Chinese inventive patent titled "Method for preparing citric acid esterified starch" (Patent Publication No. CN102161708A) discloses a method for preparing potato starch citrate by means of traditional high-temperature dry heating modification. However, this method requires heating at high temperatures for a long time of 5 h to 6 h, so the preparation efficiency and the yield are both low, which is not suitable for commercial production. In addition, such starch citrate has a low utilization rate of the digestion-resistant property. The Chinese inventive patent titled "Starch citrate and preparation method thereof" (Patent Publication No. CN110372802A) discloses a modification method for preparing starch citrate by using subcritical extrusion equipment, in which the raw materials are mixed with citric acid, deionized water, and a basic catalyst, and then are sealed, extruded subcritically, washed with alcohol, dried, crushed and sieved to get the finished products.

Further, for example, the Chinese inventive patent titled "Method for preparing corrugated paper adhesive with irradiation-microwave esterified potato starch" (Patent Publication No. CN109370474A) discloses that the esterified potato starch is prepared by the combination of irradiation and microwave. The surface of the modified starch particles obtained from this method shows different degrees of depression, resulting in that the shape of starch changes. Besides, the starch treated by irradiation-microwave has poor uniformity.

SUMMARY

The present disclosure aims to overcome the deficiency of the prior art and provides a rapid preparation method of citric acid modified starch with a high digestion-resistant property, in which starch is modified by using infrared radiation dry heating equipment, which has high preparation efficiency and stable modification effect. Also, the process is green and environmentally friendly, which is suitable for continuous production and can considerably improve the digestion-resistant property of starch.

Infrared radiation is electromagnetic waves with wavelengths ranging from 0.75 µm to 1000 µm. When the infrared electromagnetic waves radiate on the surface of food, the electric field, the vibration and rotation states of atoms and molecules in the food can be induced to change. Due to the differences in terms of the nature, type and surface condition of the object, as well as the different wavelengths of infrared radiation, when infrared radiation arrives on the surface of the object, a part of the infrared radiation reflects off the surface, and the other part of the infrared radiation will enter the interior of the object. The energy absorbed by the object will be converted into the thermodynamic motion of molecules, thus heating the object and entering a state of high temperature, so that the dry heating treatment conditions required for the modification of starch can be achieved rapidly. Compared to microwave irradiation treatment, modification by infrared radiation can achieve better uniformity, and the resulting starch particles may have a more complete morphology.

In the present disclosure, infrared radiation is applied to the modification of starch, thereby providing a modification method with high efficiency, good uniformity, and mild modification processes, which is suitable for continuous production with excellent properties, increases the yield of starch citrate and improves the digestion-resistant property.

In one aspect, the present disclosure provides a method for preparing modified starch with a high degree of substitution, which includes the following steps:

(1) preparing a citric acid aqueous solution;
(2) adding starch into the citric acid solution for a reaction for a period of time to get a mixture of citric acid and starch;
(3) placing the mixture of citric acid and starch obtained from step (2) under a condition of infrared radiation for a reaction for a period of time to get the modified starch with the high degree of substitution.

In a preferable embodiment, the intensity of infrared radiation in step (3) is 200° C. to 275° C., preferably 225 to 250° C., and more preferably 250° C. Preferably, the infrared radiation is selected from mid-infrared radiation with a radiation wavelength ranging from 3.2 μm to 7.6 μm.

In a preferable embodiment, the reaction time of infrared radiation in step (3) is 5 min to 10 min, preferably 5 min to 7 mm.

The modified starch with a high degree of substitution prepared in the present disclosure has a degree of substitution not lower than 0.1, preferably not lower than 0.12, more preferably not lower than 0.13, more preferably not lower than 0.14, and more preferably not lower than 0.15.

Furthermore, in step (1), the mass concentration of citric acid in the citric acid aqueous solution is 20% to 70%, preferably 30%, 40%, 50%, 60%.

Furthermore, in step (2), the mass ratio of starch dry matter to citric acid is 1:5 to 5:1, preferably 1:2-2:1, and more preferably 1:1.

Furthermore, the above method also includes adjusting the pH of the citric acid solution in step (1) to 2 to 5, preferably 3 to 4.

Furthermore, in step (2), the reaction time after adding starch is 10 h to 40 h, preferably 12 h to 24 h.

Furthermore, the starch in step (2) is selected from cereal starch; preferably, the cereal starch includes rice starch, glutinous rice starch, corn starch, etc.; more preferably, the starch has a purity of 95% to 99%.

Furthermore, after step (2) of obtaining the mixture of citric acid and starch, the method also includes: drying the mixture of citric acid and starch, then crushing and sieving, and collecting the sieved powder. Preferably, the mixture is dried to a moisture content of 5% to 10%; preferably, the sieve is a 50 to 200-mesh sieve, more preferably, a 100-mesh sieve.

Furthermore, after step (3) of placing the mixture of citric acid and starch obtained from step (2) under a condition of infrared radiation for a reaction for a period of time, the method also includes dry heating the reactants. Preferably, the dry heating is conducted at 50° C. to 150° C. for 0.5 h to 5 h. Optionally, after dry heating the reactants, the method also includes removing extra unreacted citric acid from the reactants. Optionally, after removing the extra citric acid, the method also includes: drying and crushing the reactants. Preferably, the reactants are dried to a moisture content of 10% to 14%.

The present disclosure uses starch as the raw material, combines starch with citric acid, and performs infrared radiation dry heating modification, thus rapidly preparing citric acid modified starch with a digestion-resistant property. This method has advantages of an abundant supply of raw materials, large production, low cost, simple preparation process, easy operation, high preparation efficiency, environmentally friendly, and being suitable for industrial production. The present disclosure has the following advantageous effects:

The present disclosure employs citric acid as the modifier, combines citric acid with starch and achieves good modification of starch at high temperature, thereby improving the digestion-resistant property of starch. Citric acid will dehydrate under heating conditions to generate anhydride, simultaneously reacts with starch at high temperature to form starch citrate. After the esterification of starch, the hydroxyl groups on the starch molecules are substituted by functional groups with some steric hindrance, which impedes the generation of intermolecular hydrogen bonding and the aggregation of molecules, improves the digestion-resistant, property of starch, and accelerates the modification rate. Citric acid is nontoxic, the process conditions are mild and the treatment methods are relatively safe, which is highly practical. In the present disclosure, starch and citric acid are cross-linked by using the infrared treatment technology, and the dry heating treatment is used to promote the modifier citric acid into starch, resulting in the significant and stable modification effect. The high-intensity infrared radiation treatment can reduce the treatment time of dry heat modification of the esterified starch, which can achieve similar substitution effects to the traditional dry heat modification processes with a short time period, that is, the high modification efficiency. The present disclosure employs a green and environmentally friendly process for preparing starch citrate, no toxic chemical reagents are used in the whole preparation process, and the crosslinking index of the complex is high. Starch citrate prepared in the present disclosure is superior to products synthesized by other chemical methods and modified by radiation.

DETAILED DESCRIPTION OF THE EMBODIMENTS

The present disclosure will be further illustrated below in combination with the following embodiments. The following are only preferable embodiments of the present disclosure but do not limit the present disclosure in any other forms. The above disclosures can be changed into equivalent embodiments with the same variations by these skilled in the art. Any simple modifications or equivalent changes made to the following embodiments according to the substantial technology of the present disclosure without deviating from the content of the present disclosure all fall within the protection scope of the present disclosure.

Embodiment 1. Preparation of Citric Acid Modified Starch 20 g of citric acid was dissolved in 20 mL of distilled water, and stirred until citric acid was dissolved completely. 10 mol/L of NaOH solution was added to adjust pH to 3.0 to 4.0. 20 g of glutinous rice starch was added under continuous stirring and statically reacts for 16 h. The mixture of citric acid and starch was dried in a low-temperature drying oven to a moisture content of 8%, and the drying temperature was kept at 50° C. After drying, the mixture was taken out and crushed, then sieved over a 100-mesh sieve to collect the sieved starch powder. The collected starch powder was placed in the mid-infrared equipment at infrared radiation temperatures of 175° C., 200° C., 225° C., 250° C., and 275° C. respectively, within an infrared radiation range of 3.2 μm to 7.5 μm, so that they were reacted fully at high temperatures for 5 min. The reactants were taken out and placed into a constant temperature oven at 130° C. for dry heating for 2 h, then washed with water to remove extra citric acid that had not been reacted with starch. After washing with water, the starch samples were dried in a low-temperature drying oven at 50° C. to a moisture content lower than 14%. The dried samples were taken out and crushed to rapidly obtain the citric acid modified starch with a digestion-resistant property.

Embodiment 2. Detection on the Properties of Citric Acid Modified Starch Prepared in Embodiment The starch that has been treated by infrared radiation at five different temperatures in Embodiment 1 was determined for the degree of substitution by means of acid-base titration. The degree of substitution refers to the moles of active hydroxyl groups, substituted by ester groups, on each D-glucose unit of starch, the degree of substitution can reflect the denaturation degree of starch. The results were shown in Table 1 below, wherein the degree of substitution increased obviously at the infrared radiation temperature of 250° C., while the degree of substitution showed a downward trend correspondingly at the infrared radiation temperature of more than 250° C. Hence, at the infrared radiation temperature conditions ranging from 200° C.; to 250° C., the degree of substitution of the starch was at a high level, which indicates the suitable temperature range of infrared radiation was from 200° C. to 250° C.

TABLE 1

Degree of substitution of the starch before and after treatment in Embodiment 1

| Temperature of infrared radiantion/° C. | Degree of substitution |
|---|---|
| Initial | 0 |
| 175 | 0.072 |
| 200 | 0.091 |
| 225 | 0.125 |
| 250 | 0.141 |
| 275 | 0.107 |

Embodiment 3. Preparation of Citric Acid Modified Starch 20 g of citric acid was dissolved in 20 mL of distilled water, and stirred until citric acid was dissolved completely. 10 mol/L of NaOH solution was added to adjust pH to 3.0 to 4.0, 20 g of cereal starch was added under continuous stirring and statically reacts for 16 h. The mixture of citric acid and starch was dried in a low-temperature drying oven to a moisture content of 8%, and the drying temperature was kept at 50° C. After drying, the mixture was taken out and crushed, then sieved over a 100-mesh sieve to collect the sieved starch powder. The collected starch powder was placed in the infrared equipment at an infrared radiation temperature of 250° C., and then fully reacts at the high temperature for 1 min, 3 min, 5 min, 7 min, and 9 min respectively. The reactants were taken out and placed into a constant temperature oven at 130° C. for dry heating for 2 h, then washed with water to remove extra citric acid that had not been reacted with starch. After washing with water, the starch samples were dried in a low-temperature drying oven at 50° C. to a moisture content lower than 14%. The dried samples were taken out and crushed to rapidly obtain the citric acid modified starch with a digestion-resistant property.

Embodiment 4. Detection on the Properties of the Citric Acid Modified Starch Prepared in Embodiment 3

The starch that has been treated by infrared radiation for five different times in Embodiment 3 was determined for the degree of substitution. The determination results on the degree of substitution were shown in Table 2 below, wherein when the starch was treated at an infrared radiation temperature of 250° C. for 7 min, the degree of substitution increased obviously; when it was treated for 5 min to 7 min, the degree of substitution was at a high level. Therefore, the suitable time range of infrared radiation was from 5 min to 7 min.

TABLE 2

Degree of substitution of the starch before and after treatment in Embodiment 3

| Temperature of infrared radiantion/° C. | Degree of substitution |
|---|---|
| Initial | 0 |
| 1 | 0.037 |
| 3 | 0.080 |
| 5 | 0.141 |
| 7 | 0.156 |
| 9 | 0.124 |

What is claimed is:

1. A method for preparing modified starch comprising the following steps:
   (1) preparing a citric acid aqueous solution;
   (2) adding starch into the citric acid aqueous solution for a first period of time to get a mixture of the citric acid and the starch;
   (3) placing the mixture of the citric acid and the starch obtained from step (2) under a condition of infrared radiation for a second period of time to get a modified starch;
   wherein the infrared radiation in step (3) heats the mixture of the citric acid and the starch to 250° C.;
   the second period of time of the infrared radiation is 5 min to 7 min;
   the infrared radiation is mid-infrared radiation, with a wavelength ranging from 3.2 μm to 7.6 μm.

2. The method according to claim 1, wherein in step (1), a mass concentration of citric acid in the citric acid aqueous solution is 20% to 70%.

3. The method according to claim 1, wherein in step (2), a mass ratio of starch dry matter to the citric acid is 1:5 to 5:1.

4. The method according to claim 1, wherein after step (2) of obtaining the mixture of the citric acid and the starch, the method further comprises the steps of drying the mixture of citric acid and starch, then crushing and sieving, and collecting sieved powder.

5. The method according to claim 1, wherein after step (3) of placing the mixture of the citric acid and the starch obtained from step (2) under the condition of the infrared radiation the second period of time, the method further comprises a step of dry heating reactants.

6. The method according to claim 5, wherein after dry heating the reactants, the method further comprises a step of removing extra unreacted citric acid from the reactants.

7. The method according to claim 6, wherein after removing the extra unreacted citric acid, the method further comprises the steps of drying and crushing the reactants.

8. The method according to claim 5, wherein the dry heating is conducted at 50° C. to 150° C. for 0.5 h to 5 h.

9. The method according to claim 8, wherein after dry heating the reactants, the method further comprises a step of removing extra unreacted citric acid from the reactants.

10. The method according to claim 1, wherein the starch is cereal starch.

11. The method according to claim 1, wherein the modified starch has a degree of substitution of a number of moles of active hydroxyl groups substituted by ester group on each D-glucose unit of the modified starch of at least 0.141.

\* \* \* \* \*